INVENTORS
KEIJI TSUJIHATA
YASUHIRO SAWADA

ATTORNEYS

United States Patent Office
3,262,770
Patented July 26, 1966

3,262,770
METHOD OF CONTROLLING THE THICKNESS OF A CHARGED RAW MATERIAL LAYER IN DWIGHT-LLOYD SINTERING MACHINE
Keiji Tsujihata and Yasuhiro Sawada, Kitakyushu, Japan, assignors to Yawata Iron & Steel Company Limited, Tokyo, Japan, a corporation of Japan
Filed May 3, 1963, Ser. No. 277,737
Claims priority, application Japan, May 11, 1962, 37/19,082
3 Claims. (Cl. 75—5)

This invention relates to an automatic controlling method for improving production in a Dwight-Lloyd sintering machine to the maximum degree. More particularly, the present invention relates to an automatic control method for obtaining the optimum thickness of a layer of a raw material to be charged to a sintering machine.

Heretofore, in the sintering of powdered ore in a Dwight-Lloyd sintering machine, control of the thickness of the layer of charged raw material according to the kind of raw material has never been carried out. In general, in a sintering operation, an ample increase in the amount of production may be obtained by adjusting the thickness of the layer of the charged material in accordance with the kind of raw material. However, because of the lack of necessary controls in the conventional sintering operation the maximum increase in the production could not be obtained.

An object of the present invention is to provide a method of achieving the optimum sintering state by adjusting the thickness of the layer of the raw material fed to a Dwight-Lloyd sintering machine, thereby to increase the production of the sintered ore.

The other objects of the present invention will become clear from the accompanying drawings and the following explanation.

Figure 1:
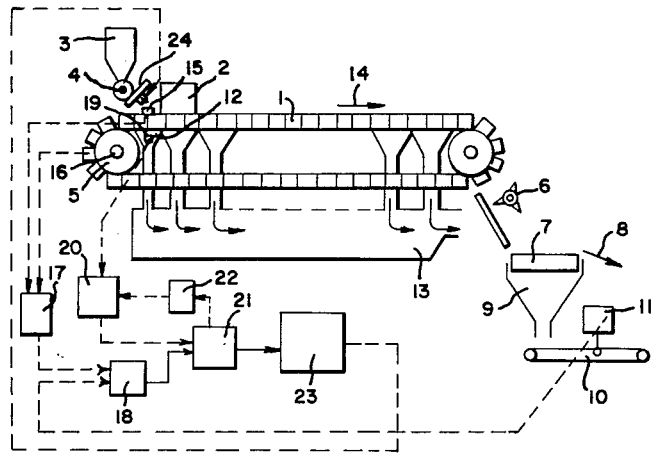
FIGURE 1 is a schematic view of the controlling system of the present invention.

As described above, the present invention is a method of obtaining the maximum amount of production in a sintering machine in response to the charged raw material and is to provide an automatic control method for a Dwight-Lloyd sintering machine wherein the optimum thickness of the layer of the fed material is obtained, at which thickness the maximum production can always be obtained for the particular charged material.

The inventors have found that by detecting the pressure in the wind box for each charge the most effective control of the layer thickness thereof for obtaining the maximum production of sinter for that particular kind of charged materials can be secured.

The control method of the present invention is, therefore, based on the principle of controlling the thickness of the layer of a charged raw material by detecting the pressure in the wind box and further exercising control by detecting the increase or decrease in the product as a result of said control.

The control method according to the said principle comprises the following steps: Prior to the operation of the sintering machine, a command, that is, a proper pressure value or a proper range of pressure values in the wind box corresponding to the optimum thickness of a layer of a charged raw material is determined statistically as a reference value on the basis of experimental values for each kind of raw material to be charged. This reference value will hereinafter be called "a set value (A)." When a certain kind of raw material has been charged, a detection of the pressure in the wind box is performed, preferably in a position ahead of the igniting furnace of the sintering machine. It may also be made in any position behind said igniting furnace but before the position in which the layer thickness becomes ⅓ of the initial total layer height.

On the basis of the deviation of the detected value from the said set value (A) an actuating signal for controlling the thickness of the layer of the charged raw material in question can be generated. That is to say, an actuating signal can be generated on the basis of the deviation each time a detecting operation is performed, when such a deviation occurs. However, in a sintering process which is generally a process of having a long response time, the control action will cause disturbances if an actuating signal is transmitted each time a detection operation takes place and the layer thickness is varied for each slight deviation of the pressure. Accordingly, the deviations should be integrated for a certain period, and the resulting control action in the form of an increase or decrease in the sinter product can then be used. Thus, in the present invention, the detected deviations are integrated for a particular time unit. They are converted until a reset time is reached. On the other hand, a reset time at which the signals are to be generated to maintain the stabilized control, is given in advance as a reference value. This reference value will hereinafter be called "a set value (B)." When the above detected deviations have been integrated until this set value (B) is reached, the actuating signal for changing the layer height is generated. In integrating the deviations, only those which are in the same direction are added and cancelled by the total of those which are in the opposite direction. That is to say, the deviations above the set value (A) are totaled and those below the same are added together, and sums are balanced against each other. According to whether the direction of the balance of deviations is (+) or (−), a signal for decreasing or increasing the thickness of the layer is regenerated. For instance, if at the end of the period of time of set value (B) a difference between the integrated value and the set value (A) is negative as compared to the set value (A), a signal for decreasing the thickness of the layer will be generated, while if the difference between the integrated value and the set value (A) is positive as compared to the set value (A), a signal for increasing the thickness of the layer will be issued. If a net balance of the integrated deviations in two different directions does not occur when the set value (B) is reached, the sintering operation will be continued without changing the thickness of the layer of the charged raw material. If a net balance occurs at the set value (B), a change in the thickness of the layer will be made.

In the examples of the present invention, as shown hereinafter a reference reset time of 20 minutes is given as the set value (B). This value is a period which exceeds slightly the time required for the detected raw material to become a product and be detected as the product. Therefore, it is a proper period wherein the result of the control action can be achieved and therefore, a relatively accurate and stabilized control can be secured. A longer period than this will make the control inaccurate.

The increase or decrease of the thickness of the layer in compliance with the actuating signal is effected step by step and, practically speaking by about 10 mm. thickness for each step in the examples, although it can be properly varied depending on the condition of the raw material. It may be also possible to change the layer height continuously in place of the step-by-step method to a fixed thickness as described above. However, the step-by-step method is preferable.

By the steps as above described a stable controlling effect can be obtained. However, the control operation will not be finished at this point. The control by means of the pressure in the wind box must be corrected by a feed back control from a change in the production. There may occur a case wherein an increase or decrease of the layer height has been effected in compliance with an actuating signal which has been issued on the basis of the integrated deviations but, the result of this control action results in a decrease of the production of sinter. In such a case, it means that the reference pressure value, that is, the set value (A), which had been assessed statistically from experimental values for obtaining the optimum production, was improper.

Therefore, in such a case it is necessary to correct the set value (A). It is therefore seen that the set value (A) as a reference value of pressure in the wind box is not a fixed value but is a trial value which can be freely adjusted towards the target of obtaining the optimum production.

The feed back control resulting from a decrease of the production is carried out as follows: When the stabilized charging of the raw material begins, the amount of raw material charged for a certain time is computed by detecting the layer thickness and the moving velocity of the sintering palette. On the other hand, after the passage of a certain time, when the raw material, the layer thickness of which has been controlled in compliance with the actuating signal and the amount of which has been also detected, reaches the sieve in the form of sintered product, the return fines are weighed and the amount of production resulting from said controlled raw material can be computed by substracting the amount of return fines extending over the same period as is used in computing the amount of the charge from said detected amount of the controlled raw material. This amount is a result of the control action just performed, and is compared with the memorized amount of production obtained from the raw material charged before the control action was performed.

In comparing both amounts of production, that is, the amount of production after the control action and that before the control action, if a decrease is indicated as a result of the control action, it indicates that the set value (A) was improper. Therefore, in such a case, even if an actuating signal is still to be generated at the reset time, such a signal will be erased and replaced by a signal for rectifying the set value (A) and a new reference value (A') will be set. Then the deviation of pressure in the wind box from the new set value (A') will be the base for the control action. Or in another case, where, after having controlled the layer thickness in compliance witht he detected deviations, the amount of production has shown an improvement as compared with the amount before the control action but the detected deviation is still different from the set value (A) or (A'), the layer thickness can again be controlled according to the existing deviations. Thus, the actuating signal generated on the basis of the deviations of pressure in the wind box can be selectively controlled by a change in the production in order to obtain the optimum production.

The actual control of the layer thickness of the raw material to be charged is effected by raising or lowering a plate down which the raw material flows to the palette according to the actuating signal, but the means for effecting the control of the layer thickness is not limited thereto. It is also possible to perform the control action disclosed in the present invention by using the temperature or temperature and pressure of the waste gas in the wind box located in a position where the sintering is completed as detected values.

The control system of the present invention is as described above. An embodiment of the present invention shall be further described hereinafter. FIGURE 1 is a view of the controlling system in a Dwight-Lloyd sintering machine according to the present invention. In the drawing, a continuous sintering palette 1 feeds an igniting furance 2 from a charging hopper 3. A drum feeder 4 is provided at the lower end of the charging hopper. A plate 24 causes the charged raw material to flow down and at the same time is a plate for controlling the thickness of the layer in this embodiment. A driving wheel 5 drives the sintering palette 1. A sintered ore crusher 66 receives sintered ore from palette 1 and feeds it to a sintered ore sieve 7. A product 8 is fed from the sieve 7 to a powdered orehopper 9 below the sieve 7. A conveyor 10 for conveying powdered ore is positioned below the sieve. A conveyed powder weighing machine 11 is provided for said conveyor 10. A wind box 12 is positioned at the lower surface of the sintering machine palette and is connected at one end to a wind exhausting pipe 13. An arrow 14 indicates the direction of advance of the sintering machine. A layer height detecting device 15, a sintering machine moving velocity detecting device 16, and a charge computing device 17 are connected together as shown. A sinter product computing device 18 is fed with the output of charge computing device 17 and weighing machine 11. A pressure detecting device 19 feeds its output to an electron tube type pressure recorder and controller 20. A memorizing and computing device 21 include a mechanism for comparing two amounts of production and a mechanism for selectively issuing a signal for rectifying the set value (A) and the layer thickness, and is fed by the output of computing device 18 and recorder 20. A set value rectifying device 22 receives the output of computing device 21 to reset value (A), and a layer thickness controlling device 23 also receives the output from device 21 and feeds the output to plate control means. The apparatus parts, arranged as described above, are thus connected with one another to control the layer thickness of the raw material being charged.

The operation of the present invention will be further explained with reference to the drawings. In starting the operation of the Dwight-Lloyd sintering machine, the set value (A), a reference value of pressure for attaining the desired thickness of the layer as determined in advance from experimental values for each kind of raw material is given to the pressure recorder and controller 20. A range of 800 to 900 mm. water column has been given as a set value (A) in the examples in the Table 1. Another set value (B), that is, a reset time of 20 minutes is also given to said pressure recorder and controller 20.

Figure 2:
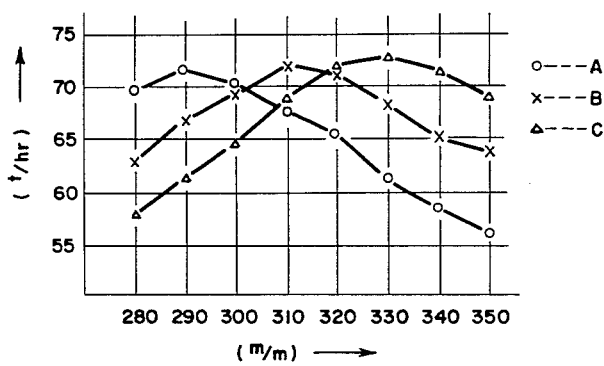
FIGURE 2 is a diagram showing relationship between the layer thicknesses of various raw materials and amounts of production.
Figure 3:
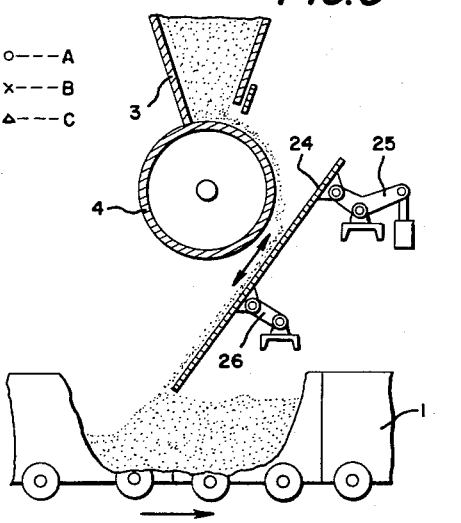
FIGURE 3 is a side elevation view, partly in section, showing an example of an apparatus for controlling the thickness of a layer of a charged raw material.

Then raw material is fed from the charging hopper 3 to the sintering machine palette 1 through the drum feeder 4 and the plate 24 for causing the raw material to flow down. When charging the raw material, the plate 24 is adjusted so that the layer thickness at the end thereof will be such as to obtain the maximum amount of production for the kind of material being charged according to the experimental values. For example, FIGURE 2 shows 290 mm. for the raw material A, 310 mm. for the raw material B and 330 mm. for the raw material C. When the stabilized charging operation of raw material proceeds, the pressure in the wind box is detected by the pressure detecting means 19 for each charge and the detected value is transmitted to the pressure recorder and controller 20, wherein deviations of said detected values from the set value (A) are integrated over the predetermined period of time period. When this time reaches the set value (B), for instance, 20 minutes in the examples of the present invention, the actuating signal for controlling the layer height is issued from the controller 20 and transmitted to the control transmitting element within the device 21.

Further, the detection of the layer thickness and the sintering machine moving velocity are carried out by the detecting devices 15 and 16 respectively. The detected thicknesses of the charged material and the velocity of the sintering machine are transmitted to the charge computing device 17. In this charge computing device, the above mentioned amount of the charge is multiplied by specific gravity, water content and coefficients of fuel or the like which are given in advance for each raw material and the result of the multiplication is transmitted to the sinter product computing device 18, where the amount of charge for a certain time is calculated.

On the other hand, after the lapse of a certain time, when the raw material, the layer height of which has been controlled and the amount of which has been computed, reaches the sieve 7, passing through the whole wind box 12 and the crusher 6, then the detection of the amount of the powdered ore below the sieve 7 is commenced by the weighting machine 11. Such detection is actuated by the timer. That is to say, the detection of the amount of return fines is commenced after a time lag covering a time interval slightly longer than the time required for one rotation of the sintering machine, as compared with the time of commencement of the detection of the corresponding charge. The amounts detected by the weighing machine 11 are also transmitted to the sinter product computing device 18 wherein the amounts of return fines are integrated for the same time as in calculating the integrated amount of the charge. By means of the timer a subtracting signal is issued, whereby the amount of production corresponding to the detected amount of charge can be computed from both integrated amounts. This computed amount of production is transmitted to the memorizing device 21 wherein the newly transmitted amount of production is compared with the prememorized amount of production, that is, the amount of production obtained before the control action was carried out.

The detection of the amount of production is thus carried out by the indirect method as above mentioned, but it is also possible to directly weigh the sinter product 8 on the sieve 7.

If the result of comparison of both amounts of production performed within the device 21 shows an increase in favor of the amount of production newly transmitted from the device 18, an actuating signal for controlling the layer thickness transmitted from the pressure recorder and controller 20 can be further transmitted to the layer thickness controlling device 23. However, if the comparison shows the reverse result, said actuating signal for controlling the layer thickness will be erased and at the same time a signal for rectifying the set value (A) will be given to the set value rectifying device 22. An operating signal will be issued from there to the pressure recorder and controller 20 wherein the set value (A) will be rectified to a new set value (A').

When the actuating signal for controlling the layer thickness issued from the device 20 enters the layer thickness controlling device 23, the operating signal issued from this device will raise or lower the lift 25 provided on the plate 24. A movable supporting arm 26 supports the lower end of plate 24. Examples of the control by the present invention are shown in the following Table 1.

*Table 1*

| No. | Before control | | | After control | | | Set value A (in mm. water col.) | Set value B (in min.) | Remarks |
|---|---|---|---|---|---|---|---|---|---|
| | Detected pressure (mean value in mm. water col.) | Amount of actual production (in tons/h.) | Layer thickness (in mm.) | Detected pressure (mean value in mm. water col.) | Amount of actual production (in tons/h.) | Layer thickness (in mm.) | | | |
| 1 | 950 | 70 | 320 | 860 | 75 | 310 | 800–900 | 20 | By reducing layer height, pressure came within the set value, and production increased. |
| 2 | 780 | 73 | 300 | 830 | 76 | 310 | 800–900 | 20 | By increasing layer height, pressure came within the set value, and production increased. |
| 3 | 950 | 70 | 320 | 920 | 75 | 310 | 800–900 | 20 | By reducing layer height, production increased, but pressure still out of the set value, readjustment was required. |
| 4 | 780 | 73 | 300 | 790 | 76 | 310 | 800–900 | 20 | By increasing layer height production increased, but pressure still out of the set value, readjustment was required. |
| 5 | 950 | 70 | 320 | 790 | 75 | 310 | 800–900 | 20 | As the setting was improper, the set value A was changed. |
| 6 | 780 | 73 | 300 | 920 | 76 | 310 | 800–900 | 20 | Do. |
| 7 | 950 | 70 | 320 | 860 | 68 | 310 | 800–900 | 20 | As the production decreased, the set value A was changed. |
| 8 | 780 | 73 | 300 | 830 | 71 | 310 | 800–900 | 20 | Do. |

In the Examples 1 and 2, the detected pressure values were brought within the set value (A) by decreasing or increasing the layer thickness and an increase in production was thereby attained. For instance, in the Example 1, the pressure was detected to be 950 mm. water column against 800 to 900 mm. water column as the set value (A). Therefore, the thickness of the layer, which was 320 mm., was reduced to 310 mm. and as a result the amount of production showed an increase from 70 tons/h. to 75 tons/h. The Example 2 is the reverse case. They are the most normal control actions according to the method of the present invention. The Examples 3 and 4 show the case wherein an increase of the production was attained by decreasing or increasing the layer thickness, but the detected pressure values after the control were still outside the set value (A). Thus, a change of the layer thickness was once more required. In Example 3, because the detected pressure value was 950 mm. water column, the thickness of the layer was reduced from 320 mm. to 310 mm., and as a result the production increased from 70 tons/h. to 75 tons/h. But the detected pressure after the control was still 920 mm. water column, exceeding 800 to 900 mm. water column of the set value (A). A further decrease of the layer thickness was required to reduce the 920 mm. water column value to a value within the set value (A).

The four Examples 5 to 8 are different from the above examples. For instance, in Example 5, because the pressure was detected to be 950 mm. water column, the thickness of the layer was reduced from 320 mm. to 310 mm. and as a result the production increased from 70 tons/h. to 75 tons/h. However, the pressure detected after the control action did not show a return to the set value (A) but went below the same, as shown by the value of 790 mm. water column. This meant that the setting of the value (A) for the raw material in question was improper. In this case, the set value was revised to 780 to 880 mm. water column. Examples 7 and 8 show the case wherein, by a control of the layer thickness the production showed a decrease, contrary to expectation. For instance, in Example 7, because the detected value was 950 mm. water column, the thickness of the layer was reduced from 320 mm. to 310 mm. However, the production decreased from 73 tons/h. to 71 tons/h. The set value (A) was changed.

The change of the layer thickness is preferably carried out by an amount of 10 mm. for each control operation. But, it is also possible to carry changes in amounts of 20 mm., 30 mm., 5 mm. or 15 mm. each time.

What is claimed is:

1. A method of keeping a layer of charged raw material in a Dwight-Lloyd sintering machine at an optimum thickness, comprising the steps of determining the pressure in the windbox of the sintering machine which is produced when the charged raw material is on the machine, determining the differences between the windbox pressure and a predetermined value of windbox pressure over a period of time, said predetermined value of windbox pressure being a pressure corresponding to a thickness of charged raw material thought to be an optimum on the basis of past experience, time-integrating said differences, and when the integrated value of the differences at the end of said period of time is negative with respect to said predetermined value, decreasing the thickness of the layer of the raw material, and when the integrated value of the differences at the end of said period of time is positive with respect to the said predetermined value, increasing the thickness of the layer of the raw material, comparing the amount of the raw material being charged per unit of time with the sintered material being produced per unit time for determining the amount of production of the machine, and when a change in layer thickness to bring the windbox pressure to within the predetermined value reduces the amount of production, changing the predetermined value to the windbox pressure prior to the said change.

2. A method as claimed in claim 1 in which the pressure in the windbox is determined for a position of the layer of charged material before it reaches the igniting furnace of the sintering machine.

3. A method as claimed in claim 1 in which the pressure in the windbox is determined for a position of the layer of charged material after it has passed the igniting furnace of the sintering machine and before it reaches a position in which the thickness of the layer is one third of the initial thickness of the layer.

References Cited by the Examiner

UNITED STATES PATENTS

| 2,410,944 | 11/1946 | Johnson | 266—21 |
| 2,878,003 | 3/1959 | Dykeman et al. | 266—21 |
| 2,980,291 | 4/1961 | Schuerger. | |

FOREIGN PATENTS

| 232,894 | 2/1961 | Australia. |
| 837,740 | 6/1960 | Great Britain. |

BENJAMIN HENKIN, *Primary Examiner.*